June 7, 1938.  L. G. BROWN  2,119,803
SUNSHADE
Filed April 20, 1937  2 Sheets-Sheet 1
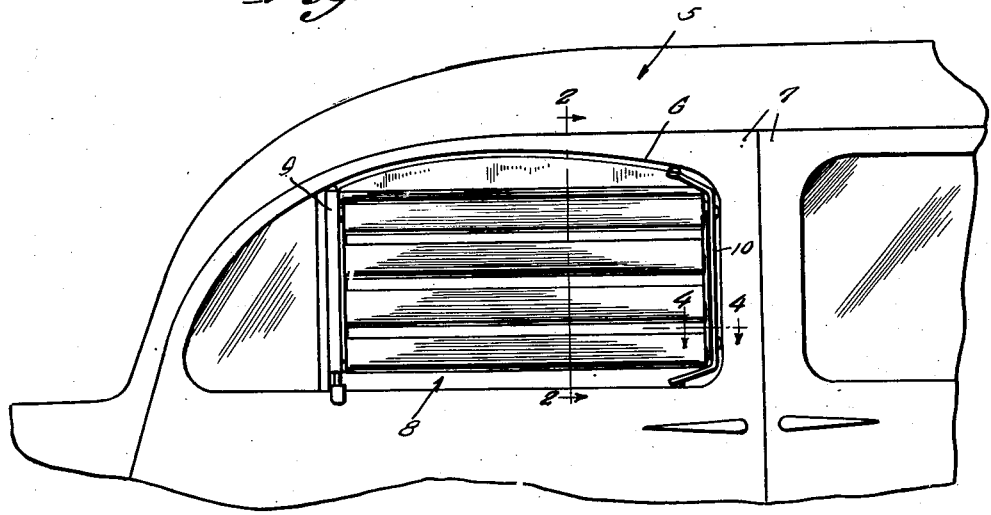
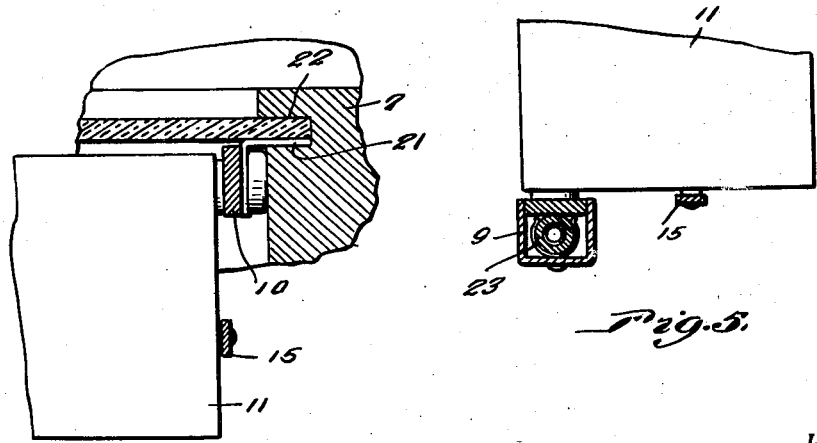
Inventor
L. G. Brown,
By Clarence A. O'Brien
Hyman Berman
Attorneys

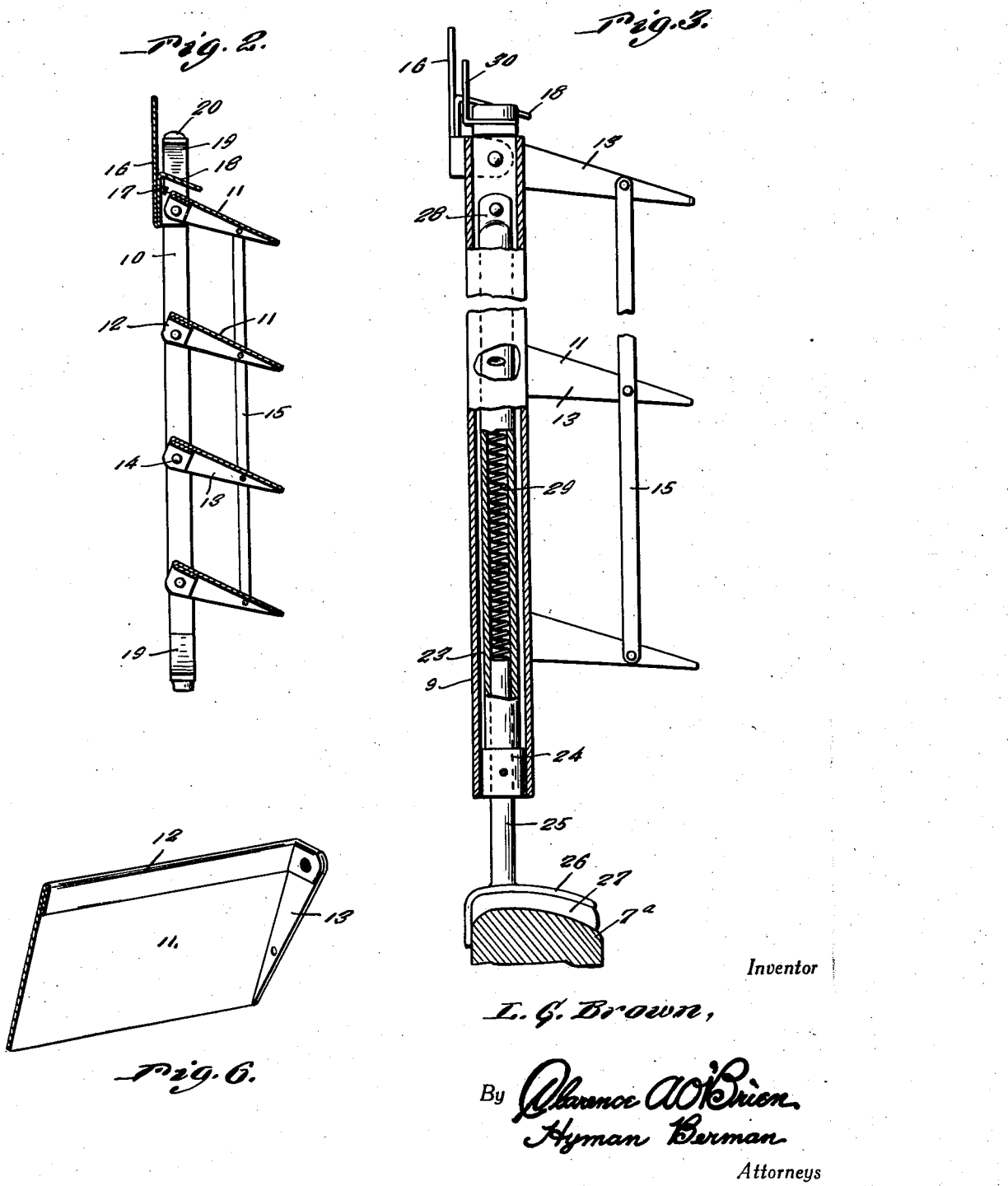

Patented June 7, 1938

2,119,803

UNITED STATES PATENT OFFICE 2,119,803

SUNSHADE

Lemual G. Brown, Oklahoma City, Okla.

Application April 20, 1937, Serial No. 138,061

1 Claim. (Cl. 189—62)

This invention appertains to new and useful improvements in sun shades, and more particularly to a shade especially adapted for the windows of automobiles.

The principal object of the present invention is to provide a sun shade for installation in the windows of automobiles of the closed type which is constructed in such a manner as to permit quick placement and displacement of the same.

Another important object of the invention is to provide a shade construction of the character stated which will adapt itself to window openings of various shapes.

Still another important object of the invention is to provide a shade construction in such a manner as to eliminate any tendency of the same to rattle or become loosened after having once been placed.

Other important objects and advantages of the invention will become apparent to the reader of the following specification.

In the drawings:

Figure 1 represents a fragmentary side elevational view of an automobile body showing the shade in mounted position.

Figure 2 represents a vertical enlarged sectional view of the shade removed from the window.

Figure 3 is a fragmentary end elevational view of the shade.

Figure 4 is an enlarged fragmentary horizontal sectional view taken substantially on the line 4—4 of Figure 1.

Figure 5 is a fragmentary horizontal sectional view.

Figure 6 is a fragmentary perspective view of one of the shutters.

Referring to the drawings wherein like numerals designate like parts, it can be seen in Figure 1, that numeral 5 represents generally the automobile body and numeral 6 the window opening in one of the doors 7.

The shade is generally referred to by numeral 8 and consists of the vertical frame members 9—10. A plurality of slats or shutters 11 are mounted between these frame members 9—10, each consisting of a metallic plate having its inner longitudinal edge portion bent backwardly onto itself as at 12 while its end portions are bent downwardly as at 13 and pivotally secured as at 14 to the corresponding frame member 9 or 10.

Connecting bars 15 connect adjacent ends of the shutters 11 as substantially shown in Figure 2.

A vertically disposed plate 16 bridges the upper portions of the frames 9—10, the plate serving to fill in the upper portion of the window opening.

This plate is provided with an upwardly disposed portion 17 which is turned outwardly and inclined as shown at 18 to provide a shed for the uppermost shutter 11, thus preventing water from getting behind the uppermost shutter 11 and reaching the interior of the vehicle.

The upper and lower ends of the frame member 10 are bent in a direction toward the frame member 11 as denoted by numeral 19 and the ends of these diverged portions 19—19 are provided with cushioned buttons or knobs 20 for engaging the body of the door 7.

Furthermore, as shown in Figure 4, lug members 21 are provided on the frame member 10 to engage into the window glass groove at 22 to prevent outward or inward movement of the shade with respect to the window opening.

The frame member 9 is of hollow construction and has the vertically extending barrel 23 therein, this barrel being secured to the bushing 24 in the lower end of the frame member 9. Vertically disposed in the barrel 23 is the shank 25 of the foot member 26 which is provided with a pad 27 for engaging the sill portion 7a of the window opening.

Interposed between the upper end of the shank 25 and the closed end 28 of the barrel 23 is the coiled compressible spring 29 tending to tensionally urge the foot 26 downwardly, while the lug 30 on the upper end of the frame member 9 engages in the glass groove of the door.

While the foregoing specification sets forth the invention in specific terms, it is to be understood that numerous changes in the shape, size, and materials may be resorted to without departing from the spirit and scope of the invention as claimed hereinafter.

Having thus described my invention, what I claim as new is:

In a shade structure for automobile windows wherein a window receiving grooveway is located including frame members; a shade structure interposed between the frame members, one of said frame members being hollow, a barrel extending longitudinally in the said hollow frame member and having one end secured to the said frame member, a lug at the upper portion of the frame member for engaging into the window receiving groove, a foot structure, a shank extending from the foot structure and being slidably disposed into the said barrel, and a coiled compressible spring in the barrel and interposed between the inner end of the barrel and the inner end of the said shank.

LEMUAL G. BROWN.